Jan. 4, 1949.    J. ISAAC    2,458,383

EXPOSURE-INDICATING SPOOL

Filed Feb. 9, 1946

JOSEPH ISAAC
INVENTOR

BY
ATTORNEYS

Patented Jan. 4, 1949

2,458,383

UNITED STATES PATENT OFFICE 2,458,383

EXPOSURE-INDICATING SPOOL

Joseph Isaac, Rochester, N. Y., assignor to Eastman Kodak Company, Rochester, N. Y., a corporation of New Jersey Application February 9, 1946, Serial No. 646,535

14 Claims. (Cl. 242—71)

This invention relates to a film spool in which a means is provided for indicating when film wound on the spool has been exposed. One object of my invention is to provide a spool in which a signal is movably mounted, this signal being automatically moved to an exposure-indicating position by placing the spool in a camera. Another object of my invention is to provide a spool in which there is a slidably-mounted signal which is definitely latched in a signaling position, after it has been moved from a non-signaling position, so that the signal may not be inadvertently moved again to its non-signaling position. Another object of my invention is to provide a signal which will not interfere with placing the spools on developing racks after the film has been exposed, and other objects will appear from the following specifications, the novel features being particularly pointed out in the claims at the end thereof.

My present invention is for an improvement over the exposure-indicating spool and camera support therefor, shown in Patent 2,367,514, J. Mihalyi, granted January 16, 1945. While somewhat resembling the form of the invention shown in Mihalyi's Figs. 1 to 3 inclusive, my improved signal has a number of advantages over the Mihalyi signal, which will be fully brought out in the following specification, and which includes additional positiveness of operation.

Coming now to the drawings wherein like reference characters denote like parts throughout:

My invention comprises broadly providing a slidable signal member in a film spool, this signal member having a non-signaling position in which the major portion of the signal lies inside of a film spool hub and having a signaling position in which the signal projects at least partially outside of the film spool hub, there being a detent tending to hold the signal in its non-signaling position, and a latch preventing the signal from being moved accidentally, or otherwise, from a signaling position to a non-signaling position.

Figure 1:
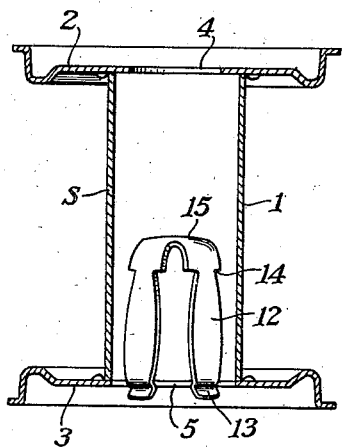
Fig. 1 is a cross-section through a spool equipped with a preferred embodiment of my improved signaling device.
Figure 2:
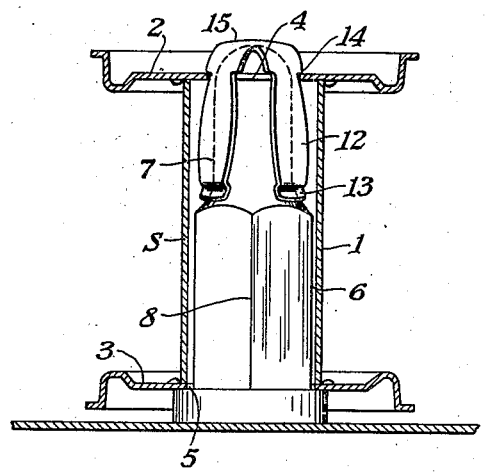
Fig. 2 is a similar view but with the spool mounted on a spool support which may be carried by a camera.
Figure 5:
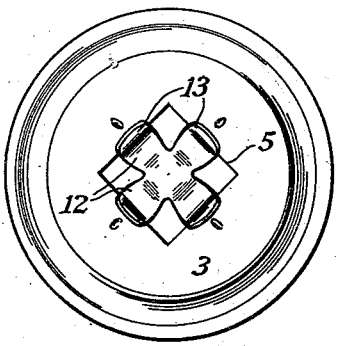
Fig. 5 is a bottom plan view of the spool and signal shown in Fig. 1.
Figure 6:
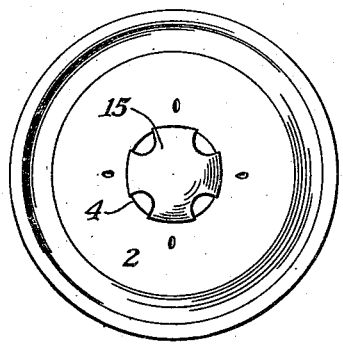
Fig. 6 is a top plan view of the spool and signal, as shown in Fig. 2.

More specifically, in the preferred embodiment of my invention shown in Fig. 1, the spool may consist of a hollow hub 1 having flanges 2 and 3 apertured at 4 and 5 to receive a spool-centering pin, or post, 6, as shown in Fig. 2.

This spool-centering post 6 is provided with a generally cylindrical and mounted end 7 and a polygonal lower portion 8 which may have any desired number of sides, four being utilized in the present instance.

The upper flange aperature 4 is made round to fit the rounded end 7 of the shaft, and the lower aperature 5 is made polygonal to fit the squared end 8 of the shaft 6, preferably fitting the squared end 8 rather loosely, so that the film spool designated broadly as S can be readily slid on the supporting post, although it is only possible to place the spool in an inoperative position by placing the flange 3 over the post first. If the rounded aperature 4 is placed over the rounded end 7 of the post 6, the spool cannot, of course, be properly seated because the diameter of the rounded end 4 is such that it cannot slide over the squared end 8 of the post.

Figure 3:
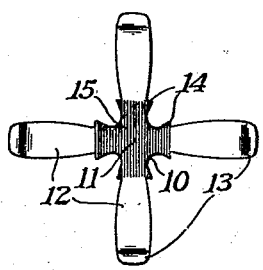
Fig. 3 shows my improved form of signal blank before this blank has been formed into its final shape.
Figure 4:
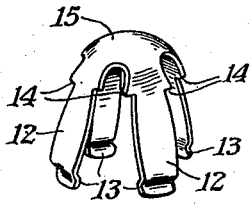
Fig. 4 is a perspective view of the formed-up signal.

I prefer to make a signal or slide member of a single piece of metal blanked out, as shown in Fig. 3. Here the signal, designated generally as 10, has a central section 11 from which spring arms 12 extend out radially, the extreme ends 13 of these arms being formed up into spring detents, as shown in Fig. 4. The upper ends of the arms are provided with shoulders 14 and in forming, the central part 11 of the signal is rounded, as shown at 15, so that the points 14 project from the spring arms 12 in such a manner that when the signal is passed through the round aperature 4, the points 14, due to the spring in the arms 12, immediately spring outwardly over the flange 2, so that, in effect, the sharp points 14 form a snap latch with portions of the periphery of the round aperture 4, thus definitely holding the signal member 10 in an exposure-indicating position. The length of the post 6 is such that when the spool S is placed on the post, the signal 10 is moved from its Fig. 1, or non-signaling position, to its Fig. 2, or its signaling position.

If desired, the central portion 11 may be lacquered or otherwise colored so as to make the signal more visible, the color preferably being selected in contrast to the finish of the spool S. The detent elements 13 on the bottom of each spring arm 12 tends to hold the signal in its non-signaling position of Fig. 1, because these detents engage the edges of the polygonal opening 5 in the flange 3. I prefer to form the number of the spring arms 12 equal to the number of sides of the polygonal opening, and I also prefer to provide the snap latches 14 on each arm 12 although I have found that two of these spring arms provided with snap latches will give satisfactory results.

With the construction above described, there is a detent between the bent-over edges 13 of the spring arms 12 and the edges of the polygonal opening 5 of the flange 3 which tends to hold the signal in its non-signaling position. This is the position which it occupies when film is sold to a customer. When the spool S is inserted on the supporting post 6, the spring arms 12 may spring inwardly as the rounded end 7 of the post 6 slides through the hollow hub 1. This releases the detent tending to hold the signal in its non-signaling position and continued movement of the spool relative to the post brings the slide 10 to its signaling position, as shown in Fig. 2. The spring arms 12 may spring sufficiently to permit the sharp corners 14 to snap through the round opening 4 in the flange 2 so that they may engage the outside walls of the flange 2 at spaced intervals. After the film has been exposed and the spool removed from the camera, the slide member 7 is firmly held against rearward movement into the spool by means of the snap latch elements 14 engaging the flange 2. Even if considerable pressure has been placed on the signal member, it cannot be pressed into the hollow core 1 because of this snap latch connection. This is an extremely useful feature because it has been found that the average user, particularly when using extremely small film spools, will pick up the spools with the thumb and finger resting on the two flanges and if this is done with reasonable pressure a signal, which is not latched in position, can readily be moved rearwardly into the hub so that it may be difficult later to tell whether or not the film on the spool has been exposed.

This spool is particularly designed for a camera where the film is wound from the spool and then back onto the same spool again without ever detaching the film from the spool hub. Under these circumstances, it is particularly necessary to have a signal which is positive in its operation and which cannot be readily displaced.

Figure 7:
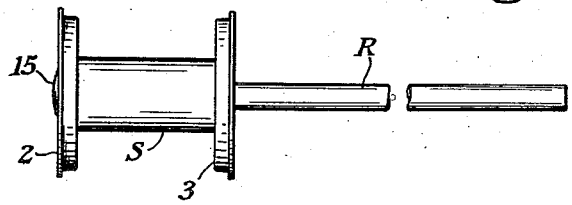
Fig. 7 is a side elevation of a spool being loaded on a developing rod, or hanger.

Because such spools, and particularly small ones, may be developed by supporting the spool on a suitable rod, or hanger, it is also necessary to provide a spool in which the rod, or developing hanger, may be passed directly through the hollow hub member 1. Thus, as indicated in Fig. 7, a developing rod R may be used and with the slide member 10 in its signaling position of Fig. 2, the rod may be thrust into the spool from the polygonal aperture end, passing the rod through the aperture 5 through the hub 1 and into the signal member 10. This member may then be slid freely outwardly through the aperture 4 since the spring arms 12 may move together as the rod R pushes the signal from the end of the spool. Thus, while my present signal is positive in operation and while there is a means tending to hold the signal in its non-signaling position, and a latch positively preventing the signal from being returned to a non-signaling position after once having been moved to a signaling position, this structure does not in any way impede placing a spool on a developing hanger, or rod.

I claim:

1. An exposure-indicating film spool comprising, in combination, a hollow hub, apertured flanges on the hub, a slide member mounted in the hollow hub having a non-signaling position inside the hub and a signaling position projecting at least partially from the hub, and a snap latch element carried by the slidable member and engageable with an aperture in a flange preventing movement of the slide member from its signaling position to its non-signaling position.

2. An exposure-indicating film spool adapted to be used on a film support having a post on which the spool may be placed in only one direction and comprising, in combination, a hollow hub of somewhat less length than the height of the post, apertured flanges on the hub, a slide mounted in the hollow hub constituting a signal and having a non-signaling position inside the hub and a signaling position projecting from the hub, said signal being moved to the latter position when the spool is placed on the post, and a snap latch carried by the slide and engageable with the spool for definitely preventing movement of the slide from a signaling to a non-signaling position.

3. An exposure-indicating film spool adapted to be used on a film support having a post on which the spool may be placed in only one direction and comprising, in combination, a hollow hub of somewhat less length than the height of the post, apertured flanges on the hub, a slide mounted in the hollow hub constituting a signal and having a non-signaling position inside the hub and a signaling position projecting from the hub, said signal being moved to the latter position when the spool is placed on the post, and a snap latch carried by the slide and engageable with the spool for definitely preventing movement of the slide from a signaling to a non-signaling position, said slide member also including a detent engageable with the spool tending to hold the slide in its non-signaling position.

4. An exposure-indicating film spool comprising, in combination, a hollow hub, flanges carried by the hub, one including a polygonal aperture and the other including a round hole, a slide member mounted in the hollow hub and substantially closing said hollow hub and having spring arms for frictionally engaging the film spool, a snap latch element on at least one spring arm for engaging and latching said slide element through engagement with a portion of a flange aperture whereby movement of said slide element in one direction is prevented.

5. An exposure-indicating film spool comprising, in combination, a hollow hub, flanges carried by the hub, one including a polygonal aperture and the other including a round hole, a slide member mounted in the hollow hub and substantially closing said hollow hub and having spring arms for frictionally engaging the film spool, a plurality of snap latch elements on at least some of said spring arms positioned to engage and latch against an aperture in a flange to hold said slide against movement in one direction.

6. An exposure-indicating film spool comprising, in combination, a hollow hub, flanges carried by the hub, one including a polygonal aperture and the other including a round hole, a slide member mounted in the hollow hub and substantially closing said hollow hub and having spring arms for frictionally engaging the film spool, a snap latch element on each spring arm for engaging and latching said slide element through engagement with a portion of a flange aperture whereby movement of said slide element in one direction is prevented.

7. An exposure-indicating film spool as defined in claim 4 in which said snap latch element engages and latches on an edge of the round hole.

8. An exposure-indicating film spool comprising, in combination, a hollow hub, flanges carried by the hub, one including a polygonal aperture and the other including a round hole, a slide member movably mounted in the hollow hub and substantially closing said hollow hub and having spring arms for frictionally engaging the film spool, a snap latch element on at least one spring arm for engaging and latching said slide element through engagement with a portion of said round aperture, each of said spring arms carrying said snap latch element also including a detent for engaging an edge of said square aperture whereby said slide may be held in either of two positions on the spool.

9. An exposure-indicating film spool as defined in claim 8 characterized by each spring arm including a snap latch element at one end and a detent at the other end.

10. An exposure-indicating film spool as defined in claim 8 characterized by each spring arm including a snap latch element at one end and a detent at the other end, said snap latch element preventing movement of the slide member in one direction.

11. An exposure-indicating film spool as defined in claim 4 characterized by the snap latch element holding the slide member projecting from the spool and in a signaling position.

12. An exposure-indicating film spool as defined in claim 8 characterized by each spring arm including a snap latch element at one end and a detent at the other end and each spring arm being of less width than the length of a side of the polygonal opening, said snap latch element preventing movement of the slide member in one direction and from a position extending outside of the film hub back into the film hub.

13. An exposure-indicating film spool as defined in claim 8 charaterized by each spring arm including a snap latch element at one end and a detent at the other end and each spring arm being of less width than the length of a side of the polygonal opening, said detent being engageable with parts of the polygonal aperture tending to retain the slide in the hub in a non-signaling position.

14. An exposure-indicating film spool comprising, in combination, a hollow hub, flanges carried by the hub, one including a polygonal aperture and the other including a round hole, a slide member movably mounted in the hub and substantially closing said hollow hub and having spring arms for frictionally engaging the film spool, a snap latch element on at least one spring arm for engaging and latching said slide element through engagement with a portion of a flange aperture, the number of said spring arms corresponding to the number of sides in the polygonal opening and being of a width less than the length of the sides of the polygonal opening to move therethrough, whereby movement of said slide element in one direction is prevented.

JOSEPH ISAAC.

REFERENCES CITED

The following references are of record in the file of this patent:

UNITED STATES PATENTS

| Number | Name | Date |
|---|---|---|
| 696,137 | Felbel et al. | Mar. 25, 1902 |
| 1,871,230 | Foster et al. | Aug. 9, 1932 |
| 2,080,026 | Albrecht | May 11, 1937 |
| 2,376,514 | Mihalyi | Jan. 16, 1945 |